Sept. 8, 1936.  R. C. BENNER ET AL  2,053,361
METHOD OF MANUFACTURING ABRASIVE COATED FABRICS
Filed Oct. 6, 1934  3 Sheets-Sheet 1
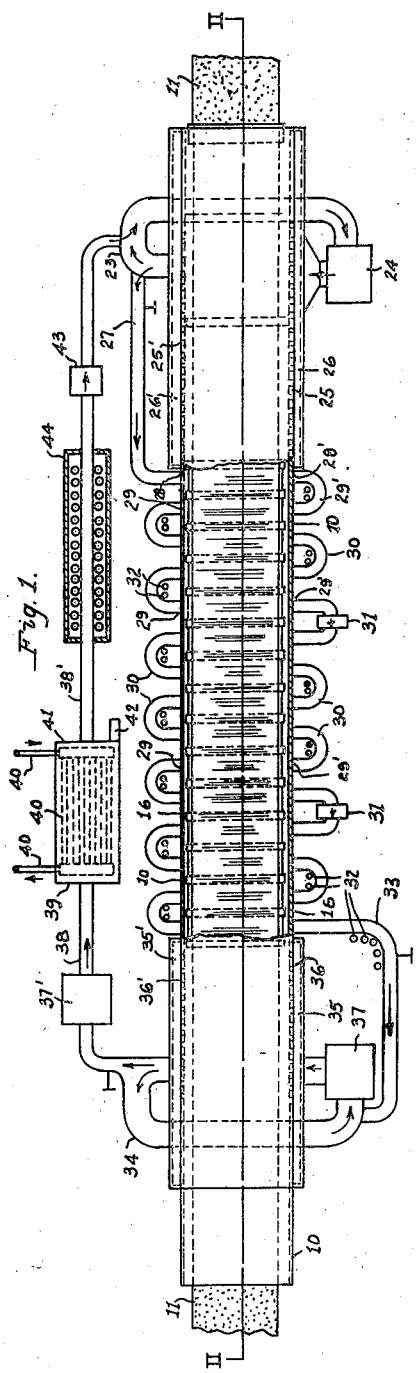
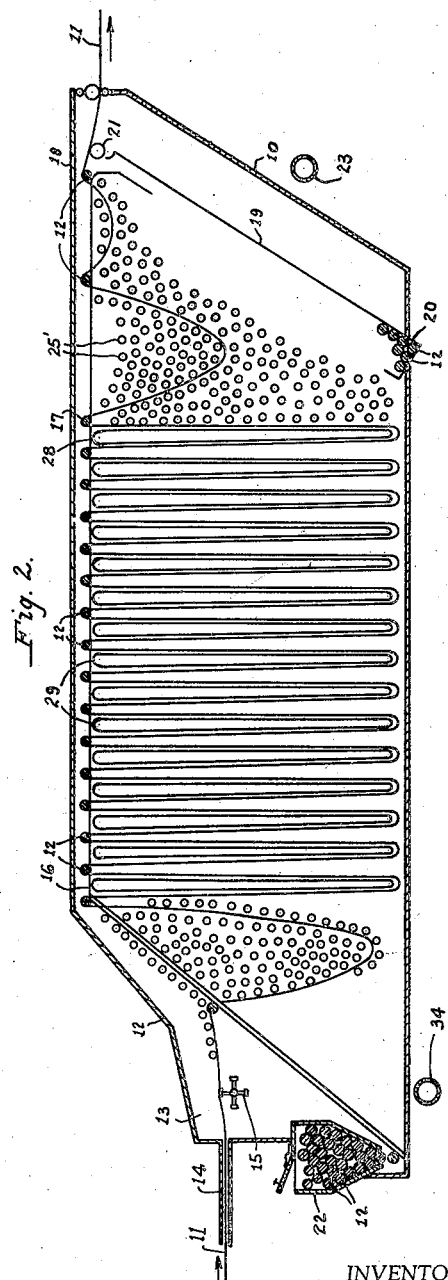
INVENTOR.
RAYMOND C. BENNER
ROMIE L. MELTON
BY
ATTORNEY.

Sept. 8, 1936.   R. C. BENNER ET AL   2,053,361
METHOD OF MANUFACTURING ABRASIVE COATED FABRICS
Filed Oct. 6, 1934   3 Sheets—Sheet 2
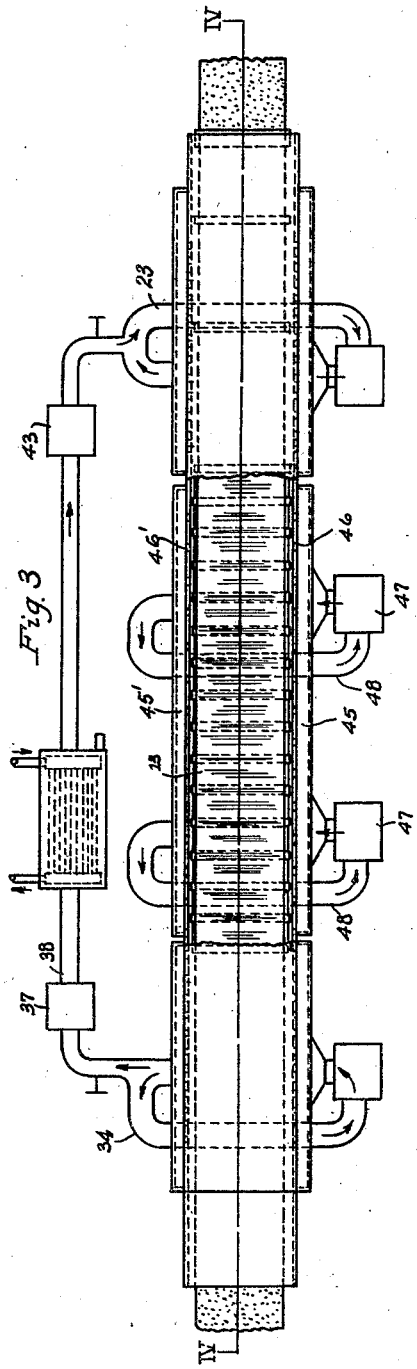
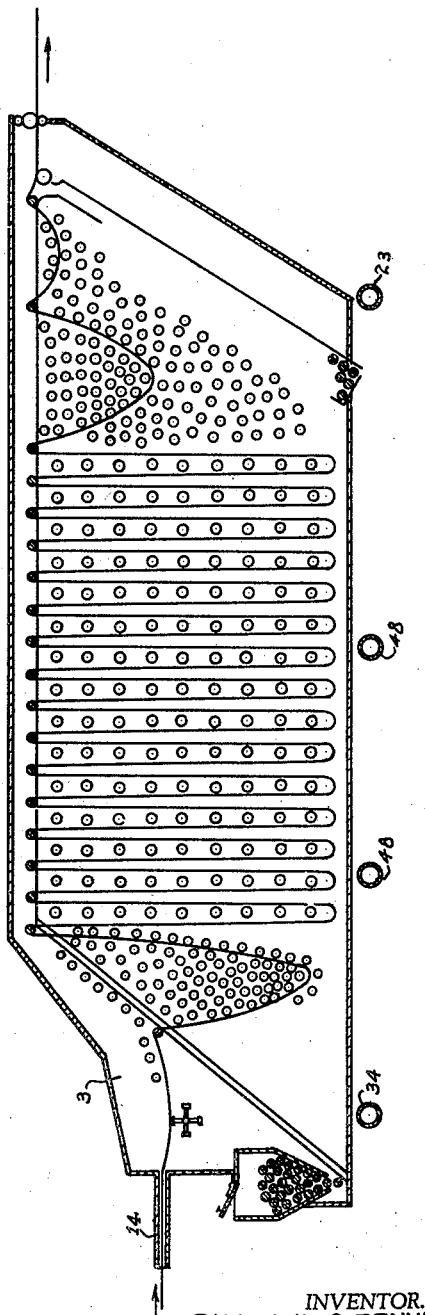
INVENTOR.
RAYMOND C. BENNER
ROMIE L. MELTON
BY
ATTORNEY.

Sept. 8, 1936.   R. C. BENNER ET AL   2,053,361
METHOD OF MANUFACTURING ABRASIVE COATED FABRICS
Filed Oct. 6, 1934   3 Sheets-Sheet 3
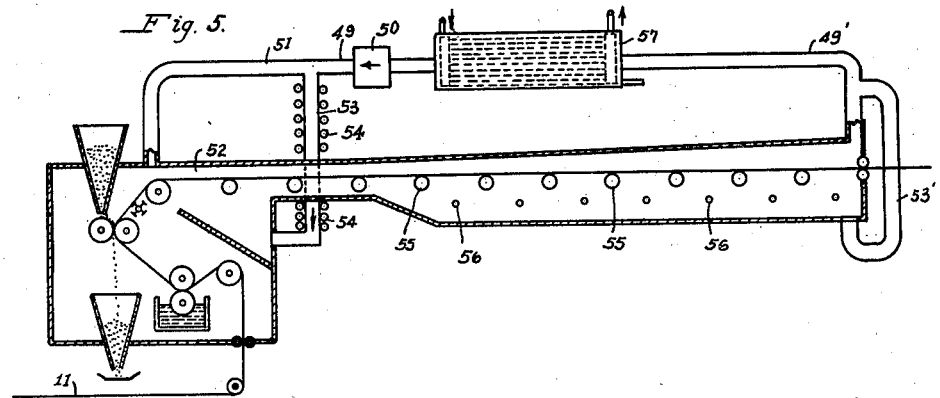
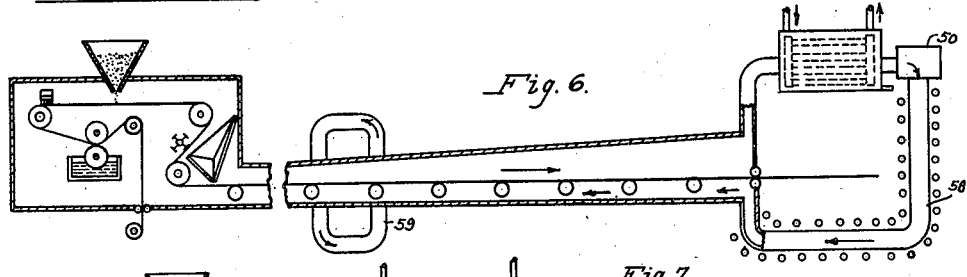
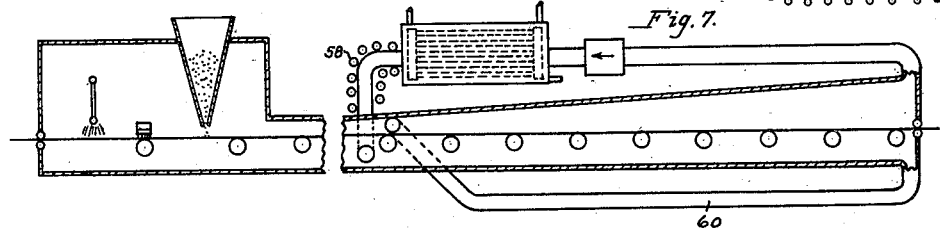
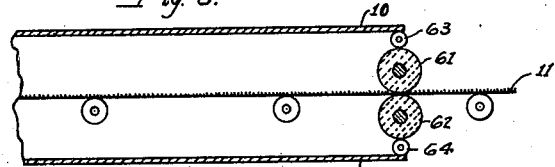
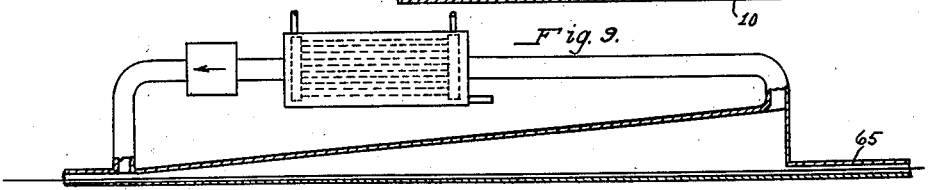
INVENTOR.
RAYMOND C. BENNER
ROMIE L. MELTON
BY RCBenner
ATTORNEY.

Patented Sept. 8, 1936

2,053,361

UNITED STATES PATENT OFFICE 2,053,361

METHOD OF MANUFACTURING ABRASIVE COATED FABRICS

Raymond C. Benner and Romie L. Melton, Niagara Falls, N. Y., assignors to The Carborundum Company, Niagara Falls, N. Y., a corporation of Pennsylvania Application October 6, 1934, Serial No. 747,1..

3 Claims. (Cl. 34—24)

This invention relates to the manufacture of abrasive coated fabric and particularly to methods for applying films of adhesive to fabric webs and drying the films so formed. More particularly the invention relates to methods for applying and drying films of adhesive in which the adhesive is applied in the form of an organic solution.

In the manufacture of abrasive coated fabric heretofore the adhesives commonly used were glue, applied in the form of a water solution, and varnish, applied in a solution of a drying oil such as linseed oil. The use of other adhesives suitable for the manufacture of abrasive coated fabric such as resins, for example phenolic, alkyd, vinyl, and natural resins and various rubber-base adhesives such as rubber isomers and chlorinated rubber, necessitate other means of application than those adapted to glue and varnish.

These adhesives are most advantageously used in the form of organic solutions, using as solvents volatile organic liquids such as acetone, alcohol, benzene, and ether.

The use of these solvents however is accompanied by difficulties in drying. For example when exposed to the open air a film of organic solution of adhesive tends to dry too quickly at first with the formation of a skin on the outer surface of the film which insulates the air from the remaining liquid in the film and slows up and delays the drying operation. Furthermore the solvents mentioned are relatively expensive and aside from the expense their use involves the production of disagreeable odors and the danger of explosion.

The present invention contemplates the provision of methods whereby organic solutions of the adhesives in question may be applied to suitable web and the resulting film dried without the initial formation of a skin and in a relatively short time and whereby the solvent evaporated from the film may be easily recovered and used again.

In connection with the present invention it has been found that a formation of the skin on the film to be dried immediately upon their exposure to the open air is due to the fact that the solvent evaporates from the surface of the film more rapidly than the concentrated solution formed thereby diffuses into the less concentrated portion of the film. The invention therefore contemplates methods and apparatus for controlling the rate of evaporation of solvents from the film whereby it is maintained lower than the rate of diffusion of the concentrated portion of the film solution into the less concentrated portion of the film.

The rate of evaporation is generally controlled by two factors. These are the relative velocity of the film and the atmosphere immediately adjacent the film, and the difference between the vapor pressure of the film solution and the partial pressure of the solvent in the atmosphere immediately adjacent the film. By maintaining the partial pressure of the solvent in the atmosphere immediately adjacent the film only slightly less than the vapor pressure of this film, the velocity of the atmosphere may be varied within reasonable limits without danger of too rapid drying of the film and the formation of a skin. This method of control permits easy and efficient recovery of the solvent evaporated in the drying operation. When the drying atmosphere passes over the film it picks up solvent from the film whereby the partial pressure of the solvent in the atmosphere is steadily increased and the gaseous medium passes from a position adjacent the film with the partial pressure of the solvent substantially the same as the vapor pressure of the film. To remove the solvent from this gaseous medium and prepare it for use again requires only a simple and moderate cooling step involving a reduction of the temperature of the gaseous medium a few degrees only since the method contemplates maintaining the partial pressure of the solvent in the drying gaseous medium only slightly below the vapor pressure of the solvent in the film. A solvent recovery step operated in this manner is extremely efficient because it avoids the use of extremes in temperature. As the boiling point of most of the solvents used is between 35 and 90° C. they can be cooled sufficiently to remove the required proportion of solvent by heat exchange with cooling water. Such a solvent recovery operation is cheap and easy to operate because it avoids great changes in entropy of the elements necessary to the recovery step.

As described above, the formation of a skin on the surface of adhesive film of the kind to which the present invention relates is caused by too rapid evaporation of the solvent from the surface of the film, whereby the adhesive in the portion of the film nearest the surface becomes so concentrated as to dry and form the skin before the concentrated portions has an opportunity to diffuse into the less concentrated portions of the film lying between the surface of the film and the web. The rate of diffusion of the portions of the film concentrated by evaporation at the surface thereof depends of course upon the degree of concentration of the film as a whole. It is evident therefore that at the beginning of the drying operation when the adhesive solution is most dilute, the rate of diffusion of the concentrated parts into the less concentrated parts of the film will be greatest. It is possible therefore at the beginning of the drying operation to evaporate solvent at the maximum rate possible without formation of a skin.

In the drying operation of the present invention, it has been found preferable to pass the drying medium longitudinally along the length of a portion of the web while it is passing along its length of travel. In drying operations of the type wherein a continuous stream of material is subjected to a drying medium, such as air, it is customary to pass the air and the material to be dried in counterflow, that is, the drying medium passes along a length of the path of travel of the material contrary to the direction of travel of the material. In this way the driest portion of the material is subjected to the driest drying medium. However, because of the special problem encountered in connection with the present invention, it has been found preferable to pass the drying medium in parallel flow with the web to be dried. As described above the web has on it a film of adhesive which is most dilute when the web enters the drying zone and preferably leaves the drying zone with the film substantially dry or in the most concentrated form. As set forth above also, the film in its most dilute form is most susceptible to rapid drying without the formation of a skin. It has been found advantageous therefore to contact the drying medium with the film when the latter first enters the drying zone and pass the drying medium along the length of the drying zone in the direction of travel of the web. As the drying medium passes along the length of the drying zone over the web it will continuously absorb solvent from the film with the result that the partial pressure of the solvent will be continuously increased and continuously approach the vapor pressure of the solvent in the film. As the web passes through the drying zone the film will become more and more concentrated with the result that the rate of diffusion of concentrated adhesive from the surface of the film into the interior of the film will become progressively lower. By means of the parallel flow of the drying medium however, the difference between the vapor pressure of the solvent in the film and its partial pressure in the drying medium will decrease as the rate of diffusion of the material in the film decreases. By this means the rate of evaporation of the material will be decreased along with the decrease in the rate of diffusion within the film whereby the material of the film will be dried without the formation of a skin over the surface of liquid adhesive.

Since the rate of evaporation is affected also by the velocity of the drying medium passing over the film, the method of decreasing rate of drying described above can be amplified and further controlled by varying the velocity of the gaseous medium along the length of the drying zone. This may be done by varying the cross section of the path of travel of the gas. For example, the path of travel may be continuously increased in cross section from the beginning to the end of the drying zone, or the path of travel may be maintained at a constant area of cross section from the beginning of the drying zone throughout a major portion of the zone and then increased in the latter part of the drying zone.

Since the drying operation results in absorption of heat, heat must be continuously supplied at the point of evaporation. With the method of operation described above, this may be accomplished by heating the gaseous medium as it leaves the solvent recovery step and before passage across the surface of the film. This method is somewhat objectionable however because of the apparent difficulty of heating and controlling the degree of heating of a body of gas which may vary in volume and velocity. It is preferable therefore to apply the heat to the evaporation step from a point below the web, that is, on the other side of the web from the adhesive film. This may be done by locating suitable heating means below the web in the drying zone but preferably it may be accomplished by supporting the web only at intervals throughout the drying zone and passing a stream of preheated gaseous medium in contact with the bottom of the web, that is, the side opposite the side bearing the adhesive. This method is advantageous in that it may be combined with the drying operation since the fabric of the web tends to absorb solvent from the film. This solvent diffuses through the web and may be evaporated from the opposite side of the web. Therefore by passing a portion of the gaseous medium which has been stripped of a part of its solvent content along the length of the web in the drying zone and in contact with the lower or exposed side of the web and by suitably heating this second stream of drying medium the film of adhesive may be dried from both sides at once. As the diffusion of solvent through the web is naturally lower than the evaporation from any part of the web this method of drying will not form a thick impervious layer adjacent the web as in the case of the formation of a skin on the top of the film. As this step of drying the film through the web is entirely supplementary to the drying from the surface of the web, this method of drying and applying to the web reduces considerably the length of drying zone necessary and thereby reduces the volume which is necessary to include in the solvent recovery system.

The portion of the drying medium which is passed beneath the web should be supplied with heat sufficient to replace that absorbed by evaporation on both sides of the web. To supply heat to the opposite side of the web requires the maintenance of a substantial temperature gradient through the web. This may require heating the gaseous medium passing beneath the web to a substantial degree but the balancing action of the material of the web described above prevents too rapid drying. The method of applying heat to the point of evaporation of material from the surface of the film by maintaining a temperature gradient from below the film is advantageous in preventing the formation of a skin since it maintains the interior of the film at a higher temperature than the surface thereof, thus increasing the tendency of the portions of the film concentrated by evaporation to diffuse into the interior of the film.

As in the case of the stream of gaseous medium passed above the film, the stream passed below the web may be passed in either counterflow or parallel flow with the web. Similarly however it is preferable to introduce the lower stream into the drying zone at the point where the web enters the drying zone and passes along the length of the web in the drying zone in the direction of travel of the web. The lower stream of gaseous medium is hottest at the point of introduction since its heat is continuously absorbed by the processes of evaporation. Consequently the relatively high temperature of the lower stream is less likely to cause too rapid drying of the film at the point in the drying zone where the film is most dilute, that is at the point of entrance of the web to the drying zone.

The lower stream of drying medium may be formed by diverting a part of the stream of gaseous medium from the solvent recovery step and heating it; or the entire stream of gaseous medium from the solvent recovery step may be heated to the proper temperature and passed beneath the web first and then across the surface of the film in succession. This method is advantageous in that it is simpler and requires the use of less equipment and the exercise of less control. In order to supply heat all along the lower side of the web, it is necessary that the lower stream pass from the drying zone at a temperature above the temperature of the stream which passes over the film. It is advantageous and convenient therefore to take advantage of the elevated temperature of this lower stream and simply pass it in succession through the lower and then the upper portion of the drying zone.

In connection with the method of drying which utilizes a drying medium having a partial pressure of solvent only slightly below the vapor pressure of the film to be dried, it is necessary to maintain the web within a drying zone for a substantial time and to pass a relatively great quantity of drying medium in contact with the web to be dried. In present methods of manufacture of abrasive coated paper and cloth provision is made for passing the paper through the operation at speeds varying from 50 to 250 feet per minute. In order to maintain an efficient and sufficient recovery of solvent from the process it is necessary to maintain the web within the drying zone until a sufficient proportion of the solvent has been removed. When the methods of the present invention are adapted to the method and apparatus used previously in the manufacture of abrasive coated paper and cloth using the means set forth above, it is necessary to enclose a substantial portion of the path of travel of the web in a drying zone connected in series with a solvent recovery apparatus. It is preferable however to operate the coating apparatus whereby the web passes through the manufacturing steps at a lower rate of speed, for example, as low as 15 to 25 feet per minute. This lower rate of travel of the web makes it possible to enclose a considerably smaller portion of the web in a drying zone to keep it in contact with the drying medium circulating through the solvent recovery means for a sufficient length of time. Furthermore the lower rate of travel of the web is particularly advantageous for use in connection with the method of drying set forth above wherein the drying medium is passed through the drying zone in parallel flow with the web, since the velocity of the drying medium is proportional to the difference in the speed of the drying medium and of the web.

The invention will now be further described with reference to the accompanying drawings which are illustrative only, the invention being limited only by the appended claims.

In the drawings Figure 1 is a diagrammatic plan view partly in section of apparatus suitable for carrying out the method of the invention;

Figure 2 is a sectional view along line II—II of Figure 1;

Figure 3 is a view similar to Figure 1 of a modification of the apparatus shown in Figure 1.

Figure 4 is a sectional view along line IV—IV of Figure 3;

Figure 5 is a diagrammatic longitudinal section of an apparatus suitable for carrying out the present invention;

Figure 6 is a view similar to Figure 5 of a modification thereof;

Figure 7 is a view similar to Figrue 5 of a modification thereof;

Figure 8 is an enlarged section of a portion of Figures 2, 4, 5, 6 and 7; and

Figure 9 is a longitudinal section of an apparatus suitable for carrying out the present invention.

Figures 1, 2, 3 and 4 illustrate apparatus for applying the method of the present invention to methods of making abrasive coated paper and cloth in which the paper passes through the manufacturing apparatus at a relatively high speed. Referring to Figures 1 and 2 the drying operation is substantially enclosed by a shell 10 of suitable material in which the paper or cloth web 11 is carried on slats 12 of a suitable material, for example wood. The moving web 11 enters the drying chamber 13 enclosed by the shell 10 by means of openings 14 in the shell 10. Immediately inside the chamber 13 the web 11 is supported and assisted in its travel by rotating member 15. The web 11 is then caught up by one of the wooden slats 12 which is carried by stops on an endless chain, not shown, up the incline 15 to the top of the chamber 13 where the slat 12 is placed by its ends on support 16. The speed of the endless chain and the location of the stops thereon are arranged with reference to the rate of travel of the web 11 whereby the web is caught up at the right level to produce a festoon of the correct length by the time the slat 12 has passed to the top of the incline support 15, the web 11 being slid over the slat 12 during the passage up the incline support 15.

When the slat 12 is placed on the support 16 the web no longer slides over the slats but is moved forward, that is toward the right end of the apparatus shown, at definite intervals simultaneously with all the other festoons by means of an apparatus, not shown, which at intervals determined by the speed of the web and the length of the festoons move all the slats 12 supported by support 16 a distance equal to the distance between each slat.

As the festoons reach the position 17 the slats 12 are engaged by a second endless chain having stops so spaced as to intermittently engage a slat 12 and convey it towards the exit end of chamber 13, the web 11 meanwhile sliding over the slats as indicated whereby the festoon has disappeared by the time the slat reaches position 18. At position 18 the support 16 ends and the slats 12 slide off the end thereof and drop onto inclined support 19 down which they slide into hopper 20 to be removed from the chamber 13. At position 18 also the web 11 is supported by rotating roll 21 which may be a perforated suction roll for assisting the movement of the web out of the chamber 13.

A hopper 22 is provided at the front end of the shell 10 whereby the slats 12 are stored for use in conveying the web 11 through the chamber 13. The hopper 22 is arranged whereby the slats 12 are supplied to the inclined support 15 in position to be suitably engaged by the stops of the endless chain. The hoppers 20 and 22 are provided with means to close them to substantially prevent communication between chamber 13 and the outer atmosphere.

Rotating member 15, roll 21 and the shafts for the two endless chains are arranged to be driven from the outside of the shell 10 and stuffing box arrangements are provided whereby the means to drive these shafts may project through the shell 10 without permitting the escape of gaseous material from chamber 13. Similarly the indexing means for moving the slats 12 along support 16 are provided with stuffing box arrangements whereby they may be reciprocated from without chamber 13 without the loss of gaseous material from the chamber.

In this apparatus the circulation of the gaseous drying medium may be conveniently divided into three phases of the path of travel of the web through the chamber 13. One of these phases occupies that portion of the path between position 17 and position 18. In this phase the drying medium may be circulated through line 23 introduced into header 26 from which it issues through holes 25 in the shell 10 into chamber 13. The drying medium passes across the chamber 13 passing over and adjacent the film on that portion of the web 11 which is in that part of the drying chamber and passes out of the chamber through holes 25' into header 26' from which it is withdrawn by line 23 to be partly recirculated. Recirculation of the drying medium may be promoted or assisted by means of a blower 24. A relatively small line 27 is provided as shown, connected to line 23 for constantly withdrawing a small portion of the gaseous medium circulating through line 23. Line 27 may be connected by means of a suitable header, not shown, to opening 28 in the shell 10. Opening 28 is arranged whereby it is in line with the inside of a festoon during the period between the intermittent movement of the festoons through the chamber. A second opening 28' is provided on the opposite side of the chamber in the side wall of the shell 10 and in line with opening 28 whereby the two openings and the festoon in line therewith define a passageway across the chamber 13. Additional sets of openings 29 and 29' in the side wall of the shell 10 are provided and arranged with respect to the festoons whereby the inside surface of each festoon and a pair of opposite openings provide a substantially closed passageway through the chamber 13. These passageways are connected by means of return bends 30 laid as shown whereby the passageways and the bends comprise a continuous substantially unobstructed passage through the portion of the drying chamber 13 occupied by the festoons. Blowers 31 may be provided as shown to promote or expedite the circulation of the gaseous drying medium through the path thus provided. Steam lines 32 or other heating means may be provided within the return bends 30 to maintain the drying medium at the proper temperature and supply the necessary heat of vaporization.

The portion of the drying medium which is diverted from that circulating through line 23 passes through the path defined in part by the festoons of coated fabric and in doing so passes over and adjacent the undried surfaces of the said fabric. After passing through this second phase of the drying operation the drying medium passes through line 33 into a stream of drying medium which is circulating through line 34 and across the chamber 13 in the third phase of the drying operation. Steam pipes 32 or other heating means may be provided as indicated to supply the heat of vaporization to the drying medium.

The third phase of the drying operation takes place in that portion of the chamber 13 wherein the festoons are formed. The drying medium circulating through line 34 together with that added through line 33 is introduced into header 35 from which it passes through the side wall of shell 10 into chamber 13 through holes 36. The drying medium then passes across the chamber and is withdrawn through holes 36' into header 35' and is returned to line 34 through the collector adjacent. A blower 37 may be provided to regulate the flow of drying medium through the circuit. A portion of the gaseous medium circulating through line 34 is constantly withdrawn through line 38 by blower 37' and delivered to the condenser 39. The condenser is cooled by means of cooling water circulated through the pipe 40 as indicated and the gaseous medium is cooled to an extent whereby the solvent taken up by the drying medium in drying the web in chamber 13 is condensed and falls to the bottom of the chamber 41 and withdrawn through line 42. The cooled gaseous medium is then passed on through line 38' and returned to the body of gaseous medium circulating through line 23. A blower 43 may be provided as indicated to regulate the flow of gaseous medium from the chamber 41. Heating means 44 may be provided to warm the gaseous medium previous to its return to the drying system. As described previously the drying medium is maintained with a partial pressure of solvent therein whereby the difference between that partial pressure and the vapor pressure of the film of adhesive on the web is relatively slight so that the formation of a skin on the web is substantially prevented.

In the first and third phases of the drying operation the amount of film exposed to the action of the drying medium is relatively small. Furthermore the area of the path over which the air or drying medium must be circulated in order to contact the film in all the positions it may occupy in these two phases is relatively great so that for each passage of air through the chamber in these two phases the amount of air which is effective in drying the film is relatively small. It is possible and necessary therefore in these phases to drive the drying medium across the chamber at a relatively high speed and to recirculate the air or other drying medium a great many times in order to use it effectively.

In the second phase of the drying operation, that is, the one occupied by the festoons of the web, the drying medium is circulated through a relatively long narrow path wherein substantially all the drying medium is effective in drying the film in the passage of the drying medium through the path. Furthermore because of the relatively weak resistance to the passage of the drying medium offered by the relatively narrow space between the sides of the festoons and because of the lightness and relatively insecure mounting of the festoons it is desirable and necessary in this phase to circulate the drying medium at a relatively low velocity.

Consequently the three phases of the drying operation are each provided with means whereby the rate of circulation of drying medium therethrough may be governed independently of the others. By means of the blowers and valves arranged at suitable places, the drying medium can be circulated and recirculated at relatively great velocity in the first and third stages of the drying operation, and a small portion of the drying medium circulating in the first phase may be withdrawn continuously and used as the drying medium in the second phase. After passing through the second phase this small portion is continuously added to the third phase wherein the drying medium is recirculated into relatively great quantity and at relatively great velocity. The rate of passage of drying medium through the path of the second drying phase governs the rate at which the drying medium is withdrawn from the chamber passed to the solvent recovery step. It is advantageous to withdraw from the third drying phase a volume of drying medium equal to that passing through the second phase in order to keep the system in balance.

In certain apparatus for drying abrasive coated fabric wherein the fabric is suspended as festoons during the drying operation the festoons are moved forward through the drying apparatus by means of a slow motion chain rather than by an intermittent indexing device. In order to adapt the apparatus illustrated in Figures 1 and 2 to this type of drying apparatus other means for circulating the drying medium through the second phase of the drying operation than the return bends 30 may be provided. For example, referring to Figures 3 and 4, headers 45 and 45' may be provided on either side of this phase of the drying operation, these headers communicate with the chamber 13 by means of a plurality of holes 46 and 46' and circulation of the drying medium across the chamber 13 may be provided for by means of blowers 47 and return lines 48. Two blowers and return lines are indicated but it is evident that the number may be varied to suit varying conditions. As in the arrangement illustrated in Figure 1, so in the arrangement of Figure 3 the drying medium may be circulated and recirculated across the chamber 13 in the second or festoon stage of the drying operation at a relatively low velocity so as to avoid damaging or disarranging the festoons. In this arrangement also the drying medium passes over the back of the paper as well as over the web surfaces whereby the web is dried from the back as well as from the front.

Direct connection between the means for recirculating the drying medium in each of the three phases may be eliminated since the passage directly through the length of chamber 13 is obstructed only by the festoons of paper or cloth which hang to a greater or lesser distance from the floor of the chamber. In some arrangements therefore the leakage of the drying medium along the edges and bottoms of the paper may be depended upon to move the drying medium through the chamber as a whole at a sufficient rate. The constant withdrawal of drying medium from line 34 by 38 will create a difference in pressure which will tend to draw additional drying medium from the second stage to an amount substantially equivalent to that withdrawn through line 38. This in turn will cause a similar withdrawal of drying medium to an equivalent amount from the first drying stage.

In the method illustrated in Figures 1 to 4 the drying medium which is most free from solvent is first brought into contact with that portion of the web which is most completely dry. As described above it may be advantageous in order to control and prevent the formation of a skin on the surface of the film to be dried to pass the drying medium and the web to be dried through the drying zone in parallel flow. It is quite evident that the apparatus shown in Figures 1 to 4 can be adapted easily to this method by simply reversing the direction of the blowers and suitable adjusting the valves. Heating means 44 should of course be arranged whereby the gases pass through it after passing through the solvent recovery apparatus. By this method the drying medium will simply first pass to what was above referred to as the third stage of the drying operation rather than to the first, and will circulate and recirculate therethrough in the opposite direction passing from the former third stage to the former second stage and the former first stage in order. By this method the drying medium which is most free from solvent and therefore has the greatest drying capacity will contact first the film which has the greatest proportion of solvent therein. The most rapid evaporation of solvent will therefore occur immediately upon the entrance of the web into the chamber 13. This method is feasible because the film upon its entrance into the drying is most dilute and therefore the rate of diffusion of the part concentrated by evaporation from the surface into the more dilute parts of the film will be most rapid thereby counteracting and preventing the formation of a film. As the web moves through the chamber the film will become more and more concentrated and the tendency to form a skin will therefore become greater. At the same time therefore by this method the drying medium will become richer in solvent and therefore its capacity to dry will be lessened. Accordingly the rate of drying of the film will be correspondingly reduced to prevent the formation of the skin.

In order to confine the solvent used it is necessary of course to enclose the step of applying the solvent and the step of depositing the abrasive grain on the web in a suitable chamber such as, for example the one illustrated at the left end of Figures 5, 6 and 7. In the apparatus illustrated in these figures provision is made for applying the base coating both by means of a fountain roll and by spraying means and applying a layer of abrasive grain to the base coating. It is evident however that similar means could be provided for applying the sizing coating only. It is evident that an enclosed chamber containing the coating apparatus could be suitably connected to the chamber 13 by means of the restricted opening 14. The remaining portions of Figures 5, 6 and 7 illustrate modifications of a method of drying wherein the web is passed through the apparatus at a relatively low rate. By this method the formation of the troublesome festoon is eliminated and the web can be dried in one straight passage through the drying apparatus. Referring to Figure 5 the drying medium propelled through line 49 by means of blower 50 is divided into two portions, one portion passing through line 51 and into the drying chamber 52 on the upper or film side of the web 11. The other portion of the drying medium passes through line 53 during which passage it is suitably heated by heating means 54 and is introduced into chamber 52 on the under side of the web 11. Means may be provided for slightly warming the portion of the drying medium passing through line 51 also, but the portion passing through line 53 is heated to a substantial degree above the temperature of that passing through line 51. The two streams of drying medium pass through the drying zone or chamber 52 in parallel flow with the web 11 which is supported by a series of rolls 55 whereby the under side of the web is substantially exposed to the contact of the heated drying medium. The advantages of this parallel flow of the drying medium and the film through the drying zone has been set forth above and will not be enlarged upon further. It is evident however that with the arrangement of Figure 5 there will be a constant differential of temperature between the lower and upper side of the web with the result that there will be a temperature gradient through the web which will supply to the film the necessary vaporization. If desired, heating means such as electrical heating elements or steam pipes 56 may be used to apply radiant heat to the back of the web. As shown in Figure 5, the path of the upper or cooler stream of drying medium may be progressively increased in cross section so as to reduce the velocity of the drying medium passing over the film and so control the rate of drying as to prevent the formation of a skin on the film. At the end of the drying zone the heated or lower stream of drying medium may be withdrawn through line 53' and joined with the upper stream in line 49' and passed through solvent recovery apparatus 57.

Referring to Figure 6 the whole stream of drying medium may be heated to a substantial degree, as in line 58, and passed through the drying apparatus under the web in counterflow therewith. At the forward end of the drying zone or the point where the film enters the zone the drying medium may be withdrawn from under the web by means of return 59 and introduced to the space above the web and passed back through the drying zone in parallel flow with the web. The drying medium should be heated in line 58 to a degree sufficient to provide the necessary heat of vaporization and be at the correct temperature for contact with the film at the point where it is transferred to the space over the said film.

Referring to Figure 7 the whole volume of drying medium may be heated as in line 58 and passed through the drying zone under the web in parallel flow therewith and then returned as in line 60 to the place where the web is introduced into the drying zone and above the said film. As in the arrangement shown in Figure 6 the drying medium should be heated to the proper degree whereby it supplies the necessary vaporization and is at the correct temperature for contact with the film at the point where it is introduced into the space above the film. In order to more exactly control this temperature cooling means (not shown) may be provided in connection with line 59 in Figure 6 and line 60 in Figure 7.

The substantially dried web may be removed from the drying apparatus without the escape of the drying medium from the apparatus and without injury to the abrasive surface of the web by passing it between a pair of rolls, one or both of which may be composed of relatively soft material such as rubber. Referring to Figure 8 the web 11 may be passed between a pair of rolls 61 and 62 made of sponge rubber which are mounted to rotate idly with the passage of the web. Rolls 61 and 62 are in rolling contact with relatively hard rolls 63 and 64 made of material such as hard rubber which in turn contacts with the shell 10 to substantially close the opening. The lower roll 62 may be dispensed with and the roll 64 used to close the opening between the bottom of the web and the shell 10. This method of closing the chamber at the point of exit of the web is shown diagrammatically in each of Figures 1 to 7 inclusive, although other suitable means may be employed. For example, referring to Figure 9 the exit of the web from the drying chamber may be through an elongated narrow opening 65 whereby the resistance to passage of atmosphere afforded by the relatively narrow passage will substantially eliminate the loss of solvent from the chamber or the entrance of air from the outside. In using this method of course it is advantageous to maintain the pressure at the end of the drying chamber adjacent the exit at substantially atmospheric pressure.

We claim:

1. In the manufacture of abrasive coated fabric the method of drying a continuous moving film of an organic solution of adhesive carried on a fabric web which comprises passing the said web through a restricted drying zone whereby the film and the opposite side of the said web are substantially exposed to the circumambient atmosphere, passing through the said drying zone in parallel concurrent flow with the said web and over and adjacent the said film a stream of gaseous fluid in which the partial pressure of the solvent is only slightly lower than the vapor pressure of the film in contact therewith whereby the rate of evaporation of solvent from the surface of the film is lower than the rate of diffusion of the concentrated adhesive resulting from the said evaporation into the less concentrated portion of the said film, simultaneously passing through the said drying zone adjacent and in contact with the said opposite side of the web a stream of gaseous fluid maintained at a temperature higher than that of the web whereby a positive temperature gradient exists from the said opposite side to the surface of the film, treating both said streams to remove solvent and utilizing the stripped gaseous fluid to provide the said streams.

2. In the manufacture of abrasive coated fabric the method of drying a continuous moving film of an organic solution of adhesive carried on a fabric web which comprises passing the said web through a restricted drying zone whereby the film and the opposite side of the said web are substantially exposed to the circumambient atmosphere, passing through the said drying zone in parallel flow with the said web and over and adjacent the said opposite side of the web a stream of gaseous fluid at a temperature higher than that of the web and at a speed and with a partial pressure of solvent whereby the said stream passes from the drying zone with a partial pressure of solvent only slightly less than the vapor pressure of the film in entering the said drying zone, passing the said stream a second time through the said drying zone in parallel flow with and over and adjacent the said film whereby the rate of evaporation from the surface of the said film is lower than the rate of diffusion of the concentrated adhesive resulting from said evaporation into the less concentrated portion of the said film, treating the said stream to remove a portion of the solvent whereby it has the proper content for repassage through the drying zone, warming the said stream to the proper degree for passage adjacent the said other side of the web, and recirculating the said warmed stream through the said drying zone.

3. The method of drying a film consisting of an organic solution of an adhesive and adhering to a fabric web which comprises passing a stream of gaseous fluid in which the partial pressure of the solvent is slightly lower than the vapor pressure of the film over and adjacent the said film, and simultaneously passing a second stream of gaseous fluid over and adjacent the side of the web opposite the said film, the second stream being at a higher temperature than the first mentioned stream whereby a temperature gradient insufficient to injure the fabric web is maintained between the said streams through the web.

RAYMOND C. BENNER.
ROMIE L. MELTON.